United States Patent [19]
Hatfield et al.

[11] Patent Number: 5,273,333
[45] Date of Patent: Dec. 28, 1993

[54] LOAD HOOK ASSEMBLY FOR MULTIPLE LOADS AND METHOD OF LOAD TRANSPORT

[75] Inventors: Barry D. Hatfield, Tigard; David E. Burley, Sherwood; Steven L. Ingalls, Aurora, all of Oreg.

[73] Assignee: Columbia Helicopters, Inc., Aurora, Oreg.

[21] Appl. No.: 20,355

[22] Filed: Feb. 22, 1993

[51] Int. Cl.⁵ ............................................. B66C 1/34
[52] U.S. Cl. ................................ 294/82.3; 294/82.26; 294/82.32
[58] Field of Search ......... 294/75, 82.14, 82.24–82.27, 294/82.3–82.32, 81.56, 87.1, 87.22, 87.24, 88, 90, 104, 106; 244/137.4

[56] References Cited

U.S. PATENT DOCUMENTS

| | | | |
|---|---|---|---|
| 2,986,421 | 5/1961 | Grove | 294/82.3 X |
| 3,032,365 | 5/1962 | Campbell | 294/82.3 |
| 3,163,401 | 12/1964 | Johnston et al. | 294/75 X |
| 3,666,216 | 5/1972 | Nagy et al. | 294/82.32 X |
| 4,130,313 | 12/1978 | Clifford | 294/82.32 |
| 4,173,366 | 11/1979 | Mattei et al. | 294/82.32 X |
| 4,682,804 | 7/1987 | Palmer et al. | 294/82.32 X |
| 5,040,748 | 8/1991 | Torre et al. | 244/137.4 X |

Primary Examiner—Johnny D. Cherry
Attorney, Agent, or Firm—James D. Givnan, Jr.

[57] ABSTRACT

A load hook assembly includes an upright support structure adapted for cable attachment to a lifting instrumentality such as a helicopter. A jaw assembly, carried by the support structure, has multiple, movable jaws which open and close relative a centrally disposed, fixed jaw. Each movable jaw is independently operated by an air cylinder coupled to a jaw associated toggle linkage. The movable jaws and the central, fixed jaw are spaced from one another when closed to permit lateral insertion of a ferrule on a load engaging choker cable. Each movable jaw is controlled in a remote manner by an operator to permit selective release of one or both loads. A method of load transport is also disclosed.

8 Claims, 3 Drawing Sheets

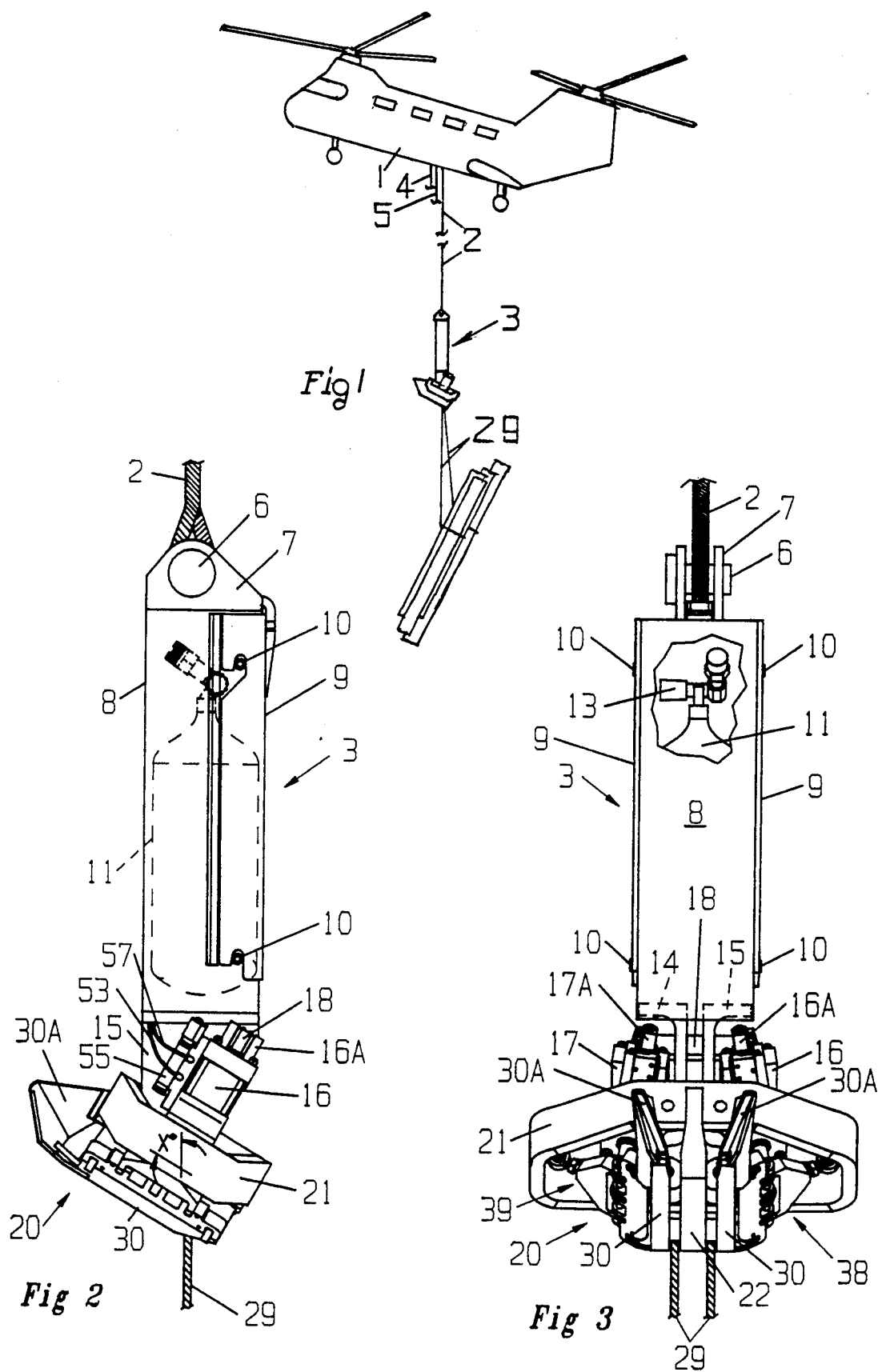

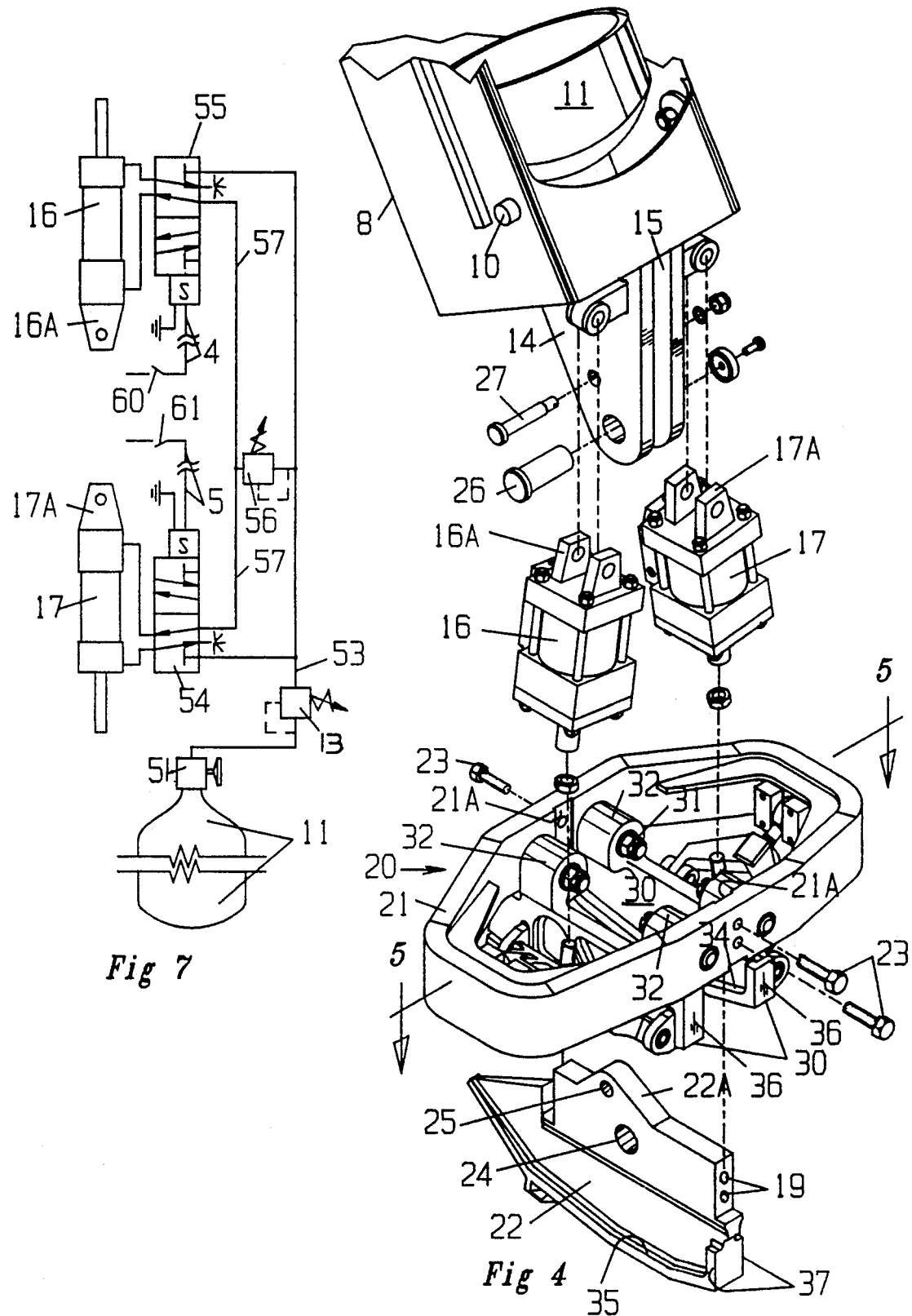

LOAD HOOK ASSEMBLY FOR MULTIPLE LOADS AND METHOD OF LOAD TRANSPORT

BACKGROUND OF THE INVENTION

The present invention pertains generally to hook assemblies interposed between a source of lifting force such as a crane, helicopter, etc., and a load to be lifted.

In the transport of consecutive loads by helicopters it is important, for operating cost purposes, to fully utilize the load lift capability on each flight where several flights are made in a work day. In the use of helicopters for transporting logs to a collection site, it is the practice to estimate log weight to fully utilize the lift capability of the helicopter. As estimating log weight is an imprecise matter, it can occur that a log load or bundle of logs will exceed the aircraft's limits in which case the load must be altered all at the loss of productive flight time. The other extreme to be avoided is the transport of light loads far below lift capability which also results in a high cost per log transported.

U.S. Pat. No. 5,040,748 discloses the use of multiple toggle assemblies which cooperate to retain a load attached pin in place on a ring which carries other toggle assemblies for attachment of other independently released loads on the ring. U.S. Pat. No. 2,986,421 shows the use of air cylinders mounted in inclined relationships to the longitudinal axis of a hook assembly.

SUMMARY OF THE PRESENT INVENTION

The present invention is embodied in a load hook assembly having multiple jaws each of which is independently controlled to permit immediate altering of a load by a crew member of an airborne helicopter. The present invention includes a method of load transport.

The present assembly comprises a pressurized air tank with conduits and valving to actuate air cylinders one each associated with a load carrying movable jaw. A fixed jaw cooperates with each of the movable jaws. Toggle linkages interposed between the air cylinders and the movable jaws enable the use of a compact air tank and cylinders to minimize the weight of the present hook assembly while ensuring virtually trouble free performance. Air tank capacity is such as to permit one or more full days of log transport with many cycles of jaw operation prior to tank recharging. Switch means remotely located such as in the aircraft permits a movable jaw to be opened for immediate load release which typically will be a single log estimated to be of a weight to bring the total load weight up to the maximum rated capability of the aircraft. The movable and fixed jaws are configured to receive a ferrule on a cable sling or logging choker from the side to permit the jaws to at all times be closed during loading to avoid risks to ground personnel by actuating air powered jaws from a point where the jaws are out of view. The jaws include nose portions which project upwardly in an inclined fashion to define a guideway through which the load cable ferrule may be readily inserted to a fully seated position without jaw movement. The ferrule, during lifting of the load, automatically is confined in place to avoid accidental release of a load. The jaws include shoulders which engage and carry the ferrules and which readily disengage from same during load release regardless of load weight on the ferrule.

Important objectives include the provision of a hook assembly for multiple loads for attachment to a lift line from a lifting source and which permits ground personnel to load the hook assembly without risk of accidental jaw actuation; the provision of a hook assembly particularly suited for helicopter logging operations, but not restricted thereto by reason of a multiple load capability each carried by a separately actuated jaw component enabling independent release of the loads; the provision of a hook assembly of compact design with a self-contained pressure tank enabling large payloads to be carried with infrequent re-charging of the tank.

BRIEF DESCRIPTION OF THE DRAWINGS

In the drawings:

FIG. 1 is an elevational view of a helicopter equipped with the present lift assembly with multiple loads suspended therefrom;

FIG. 2 is a side elevational view of the present lift assembly;

FIG. 3 is a front elevational view of the present assembly taken from the left side of FIG. 1;

FIG. 4 is a fragmentary exploded perspective view of the lift assembly;

FIG. 7 is a schematic of the air system of the lift hook assembly.

DETAILED DESCRIPTION OF THE PREFERRED EMBODIMENTS

Figure 5:
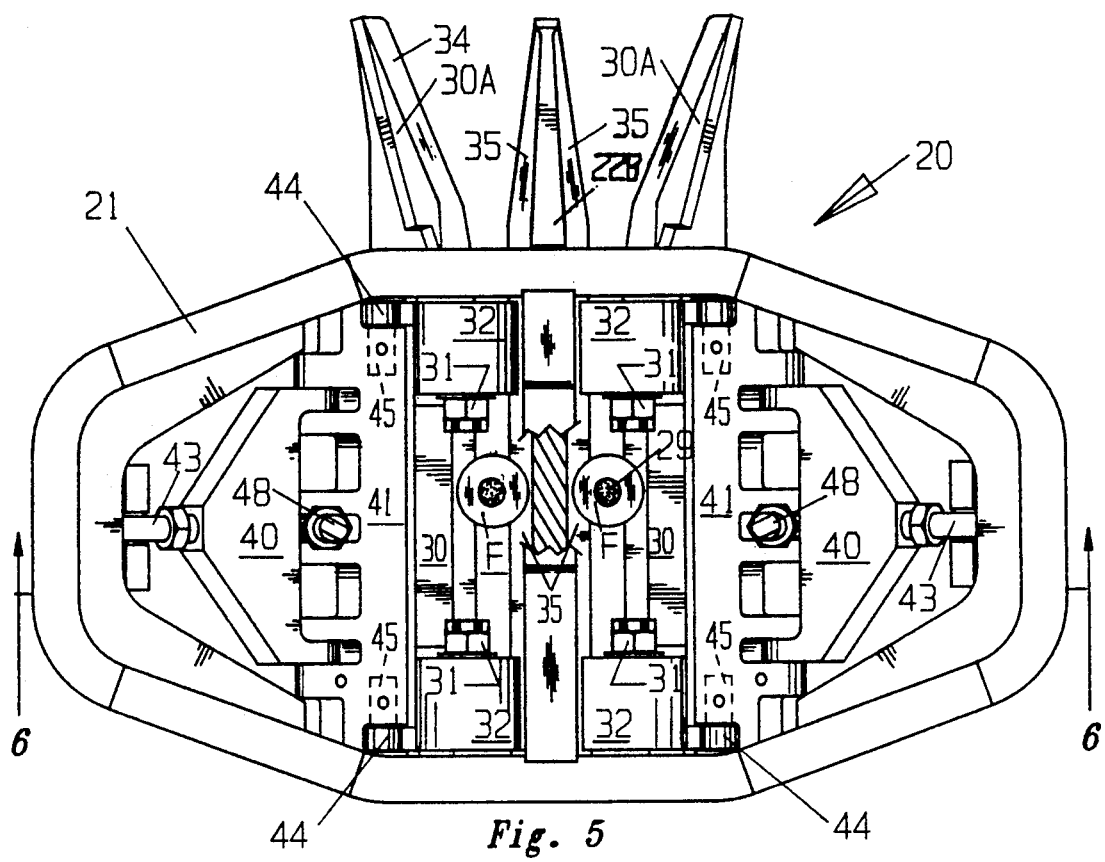
FIG. 5 is a horizontal sectional view taken along line 5—5 of FIG. 4.
Figure 6:
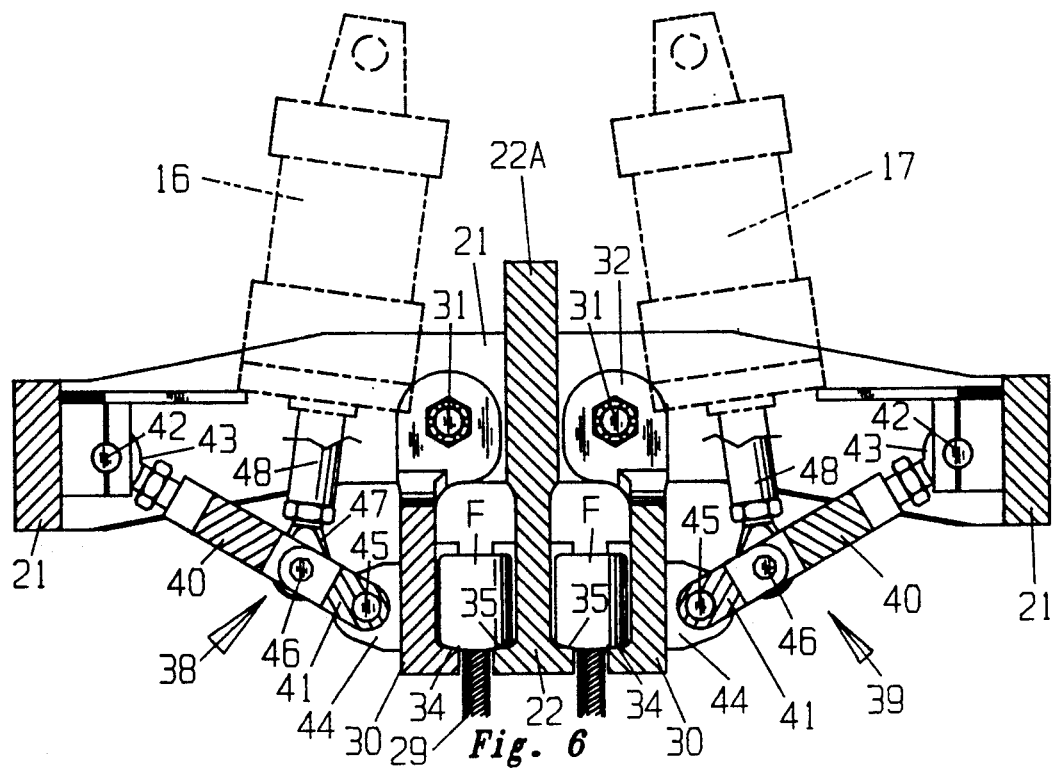
FIG. 6 is a vertical sectional view taken approximately along line 6—6 of FIG. 5.

With continuing attention to the drawings wherein reference numerals indicate parts similarly hereinafter identified, the reference numeral 1 indicates a helicopter which constitutes a suitable source of lift for the present hook assembly. While a helicopter is shown, it is to be understood that the present invention may be utilized with other lifting instrumentalities.

A lift cable 2 is carried by the helicopter and terminates downwardly at the present hook assembly indicated generally at 3. Electrical leads 4 and 5 extend from the helicopter to the lift assembly to enable actuation of later described valves from the aircraft cockpit.

Lift line 2 terminates in an eye in which is received a pin 6 in place within a clevis 7 of the present hook assembly. An air tank support structure at 8 includes a detachable access panel 9 held in place by studs 10 in place on support structure 8. Panel 9 permits access to a compressed air tank 11 for servicing and to pressure regulator 13. The lower end of the tank housing structure carries angular plates at 14 and 15 which project downwardly and are apertured for purposes of attachment to a following described jaw assembly. Additionally, angular plates 14 and 15 on support structure 8 serve to receive a cylinder mounting bar 18 which extends transversely through said plates to serve as cylinder mounting means receiving the blind end of air cylinders at 16 and 17 each equipped with a clevis 16A–17A each hingedly attached to the mounting bar by pivot pins.

With attention to FIG. 4, a jaw assembly generally at 20 includes a frame 21. A fixed jaw 22 is secured in the frame as by bolts 23 which seat within threaded bores 19 in an upper portion 22A of the fixed jaw. Said jaw upper portion fits snugly into opposed channels 21A in the frame. Bores at 24 and 25 in said upper portion 22A each receive pins at 26 and 27 which additionally extend through angular plates 14 and 15 which are in welded securement to support structure 8.

Frame 21, as illustrated in FIG. 2, is inclined at about 60° or so at X from the major axis of support structure 8 which inclination serves to position jaw 22 and later described movable jaws in an inclined manner to facilitate reception of ferrule F on choker cables 29 to retain the ferrules against movement during transport of a load. A pair of movable jaws are at 30. The following description of one movable jaw is applicable to both of said jaws. A movable jaw 30 is pivotally attached within frame 21 by bolt assemblies 31 which extend through the frame and through pairs of bearings 32 integral with the movable jaw 30. Accordingly, movable jaw 30 is mounted for powered movement toward and away from fixed jaw 22 as described later. With attention again to the configuration of the movable jaws, as best viewed in FIG. 5, the jaws have forwardly protruding end portions at 30A each of which projects upwardly and is laterally offset from a forward portion 22B of the fixed jaw therebetween. Movable jaw portions 30A diverge outwardly away from forward end portion 22B of the fixed jaw to facilitate reception of a cable attached ferrule at F during load attachment. Inserted movement of each of the ferrules F is limited by movable jaw flanges at 36 and fixed jaw flanges 37. Lengthwise extending shoulders at 34 on the movable jaws engage and support the lower extremity of the cable attached ferrule while a similar shoulder 35 on the fixed jaw also engages the under side of the ferrule.

Each movable jaw is coupled to a toggle assembly indicated generally at 38 and 39 comprising first and second toggle members at 40 and 41. First toggle member 40 is pivotally attached to frame 21 by a pivot pin 42 and a toggle eye 43 while the opposite extremity of the toggle is attached to ears as at 44 in place on the outer or back side of the movable jaw 30. A pivot pin 45 attaches the second toggle number 41 to said movable jaw while a pivot pin at 46 serves to couple a rod end 47 of a piston rod 48 of air cylinder 16 or 17. The foregoing described toggle components effect overcenter locking of movable jaw 30 in a closed position proximate fixed jaw 22. Each cylinder 16-17 is of the double acting type for powered movement of the movable jaws in both directions.

In the schematic of FIG. 7, an on-off valve 51 permits tank pressure, for example 3,500 PSI, to pass to pressure regulator 13 which reduces the pressure in a line 53 to 140 PSI. Line 53 branches with each branch terminating at solenoid actuated, four-way, two position valves at 54 and 55. Accordingly, the last noted pressure is supplied to the rod end of each of the cylinders 16 and 17 to actuate the associated toggle linkages 38-39 to swing the movable jaw 30 associated therewith to an open, load releasing position. For supplying a reduced pressure such as 50 PSI to the blind end of each cylinder 16-17, a second pressure regulator at 56 serves a branched line 57 which terminates at the four-way valves 54 and 55. Accordingly, reduced pressure is applied to the blind end of cylinders 16 and 17 for extension of their piston rods to move the associated toggle assemblies into a closed, over center, locking position to subsequently receive the ferrule on a choker or load cable 29. Each ferrule is inserted intermediate fixed jaw 22 and one of the oppositely disposed movable jaws 30 which is closed during ferrule insertion. The solenoid of each valve 54, 55 is in electrical circuit with a spring biased toggle switch as at 60 and 61 located in the cockpit of the aircraft for actuation by the pilot or copilot.

In a log transporting helicopter operation usually at a remote site, a first or primary load of a log or logs is encircled with choker cable 29 with a ferrule F. The estimated weight of the log or logs is anticipated to be at or somewhat below the lifting capacity of the helicopter. A secondary load of lesser weight, comprising a log or logs, is fitted with a second choker cable 29 having a ferrule F. Upon initiating lifting of the two loads, if the cumulative load weight as indicated in the aircraft exceeds aircraft limit, the secondary, i.e., the lesser, of the two loads is released by actuation of appropriate switch 60 or 61, to release the secondary or supplemental load, all without return of the aircraft to the ground and with little or no loss of productive flight time.

While we have shown but one embodiment of the invention, it will be apparent to those skilled in the art that the invention may be embodied still otherwise without departing from the spirit and scope of the invention.

Having thus described the invention, what is desired to be secured by a Letters Patent is:

We claim:

1. A load hook assembly for lifting separate multiple loads for attachment to a lifting means and comprising,
   an air tank and valve means for controlling tank discharge,
   a support structure for said air tank and adapted for attachment to said lifting means,
   a frame carried by said support structure,
   a jaw assembly carried by said frame and including multiple moveable jaws each having a closed load retention position and an open load release position, fixed jaw means on said frame, toggle linkages on said frame one each coupled to one each of said moveable jaws, air cylinders one each coupled to one each of said toggle linkages for actuation of said moveable jaws,
   said valve means including solenoid valves each in communication with said air tank and with one of said cylinders to control pressurized air flow to the air cylinders, and
   switch means in circuit with each of said valves for selective actuation of said air cylinders for selective opening of said moveable jaws for release of a load carried thereby.

2. The load hook assembly claimed in claim 1 wherein said fixed jaw means is located intermediate said moveable jaws, said moveable jaws including end portions outwardly offset from said frame to facilitate insertion of a cable attached ferrule into place between one of said moveable jaws and the fixed jaw means.

3. The load hook assembly claimed in claim 2 wherein said moveable jaws each include ferrule engageable shoulders.

4. The load hook assembly claimed in claim 3 wherein said shoulders are inclined from the horizontal to confine the cable attached ferrule in place during load lifting.

5. The load hook assembly claimed in claim 1 wherein said fixed jaw means includes a jaw fixedly mounted on said frame, said jaw having an upper portion, fasteners coupling said upper portion to said support structure, said jaw disposed intermediate said moveable jaws.

6. A load hook assembly for attachment to a lifting instrumentality and comprising, a support structure for attachment to the lifting instrumentality and including a source of pressurized air, a jaw assembly carried by said support structure and including a frame, multiple jaws pivotally mounted on said frame, a fixed jaw disposed intermediate said multiple jaws and cooperable therewith to receive load attached members, toggle assemblies one each coupled to one each of said movable jaws, cylinders coupled to one each of said toggle assemblies for opening and closing said movable jaws relative said fixed jaw, and said movable jaws and said fixed jaw all laterally spaced and defining open areas therebetween for the manual insertion of said load attached members into place therebetween, said movable and fixed jaws having shoulders thereon for supporting engagement with said load attached members.

7. The load hook assembly claimed in claim 6 wherein said jaws include flanges confining the load attached members against movement relative said jaws.

8. A method of transporting loads each of unknown weight by helicopter and comprising in the steps of, installing cables one each about said loads with each cable having an end attached ferrule, inserting each ferrule in a load hook assembly suspended below the helicopter and having multiple jaws with each of said jaws positionable in a remote manner to opened and closed positions and each engageable with one each of said ferrules, lifting of the loads from a supporting surface, weighing the lifted loads to determine if a predetermined load weight is exceeded, and opening one of said jaws by a remotely positioned operator in the helicopter if the predetermined load weight is exceeded to release one of said loads to reduce load weight to or below the predetermined load weight.

* * * * *